Aug. 26, 1947.   C. E. BRODERS   2,426,386
AUTOMATIC FEED HEAD
Filed June 6, 1945   2 Sheets-Sheet 1

INVENTOR.
CLAUDE E. BRODERS
BY
Gray and Smith
ATTORNEYS

INVENTOR.
CLAUDE E. BRODERS
BY Gray and Smith
ATTORNEYS

Patented Aug. 26, 1947

2,426,386

UNITED STATES PATENT OFFICE 2,426,386

AUTOMATIC FEED HEAD

Claude E. Broders, Detroit, Mich., assignor to Victor Gauvreau, Detroit, Mich.

Application June 6, 1945, Serial No. 597,836

13 Claims. (Cl. 77—33)

1

The present invention relates to an automatic feed head and more particularly to a centrifugally operated feed head adapted for use in connection with cutting, milling, reaming or drilling operations in which the particular tool to be employed is rotated while advancing toward the work piece. The tool is moved by means of a rotating spindle which is automatically advanced at a predetermined and controlled rate of advancement and is retracted at the completion of the work cycle. In my prior Patent No. 2,053,514, reissued as Reissue No. 21,341, February 6, 1940, and in Patent No. 2,280,115, issued to myself and Victor Gauvreau, there are disclosed automatic feed heads in which centrifugally actuated members are employed to feed a rotating tool to the work piece and provision is made for returning the tool at the conclusion of the work stroke.

An object of the present invention is to provide an improved automatic feed head utilizing a system of centrifugal weights designed to reduce the friction which otherwise tends to retard the rate of movement of said weights, and thus to provide an automatic feed head having improved performance characteristics.

A further object of the present invention is to provide an automatic feed head in which the rate of advancement of the tool is adjustably controlled independently of the tool feeding mechanism.

It is a further object of the present invention to provide an automatic feed head in which approximately constant feeding pressures are transmitted through a rotating spindle to a tool connected therewith and in which provision is made for automatically retracting the tool at the completion of the work stroke.

Another object of the invention is to provide a feed head in which a positive friction brake is provided to reduce quickly the rotative speed of the tool feeding weights after the tool feeding operation is completed, thus facilitating the return of the weights to their original position for beginning the next operative cycle. The braking mechanism included in the feed head of the present invention providing a positive means for stopping the rotation of the motor armature, as well as the rotating parts of the automatic feed head.

A further object of the present invention is to provide an improved feed head which is simple in construction, dependable in operation, easy to repair and service, and relatively inexpensive to manufacture, the feed head being adapted for

2 convenient utilization in all types of automatic machines in which it is desired to advance a rotating tool to a predetermined point and then automatically return the tool to its initial position.

Other objects of this invention will appear in the following description and appended claims, references being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
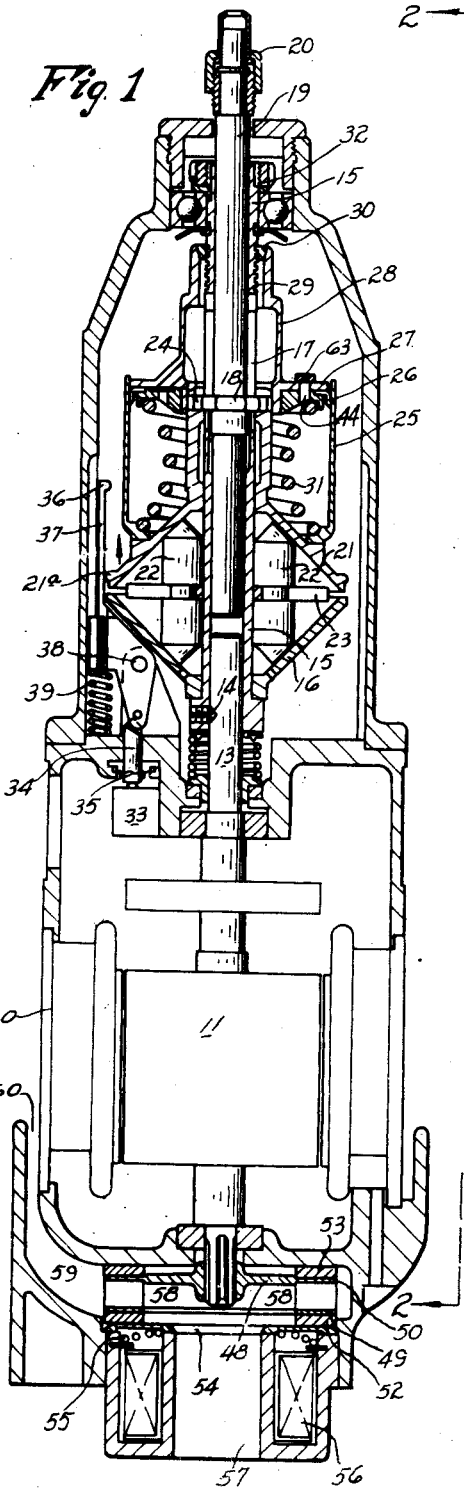
Fig. 1 is a longitudinal section of a feed head embodying the present invention.

Referring to Fig. 1, a preferred form of feed head is shown in which the power is supplied by an electric driving motor shown generally at 10 and its armature at 11. An electro-mechanical braking system of the type more fully disclosed in my co-pending application Serial No. 597,835, now abandoned, is indicated generally at 12. The output shaft 13 of the electric driving motor is keyed by screw 14 to the quill 15. A conical cup 16 is secured to the output shaft 13. The quill 15 is journalled for rotation in bearings adjacent each end and is slotted longitudinally as shown at 17 to provide a longitudinal keyway for key 18 carried by spindle 19 on the end of which a tool holding collet 20 is mounted. This provides a structure in which the rotational force of the electric motor 10 is transferred to the spindle 19 which is longitudinally movable relative to the quill 15.

A conical cup 21 is keyed to the spindle 19 through the longitudinal keyway in the quill 15. The conical cup 21 is rotatable with the quill 15 while it moves longitudinally thereof to effect longitudinal movement of the said spindle 19 relative to said quill 15. The conical cups 16 and 21 are mounted with their bases facing each other to provide an enclosed chamber of double conical proportions in which is mounted a plurality of symmetrically disposed centrifugal weights 22 carried in a spacer 23. The spacer 23 is loosely mounted on the quill 15 to permit rotation of the quill 15 relative to said spacer. The weights 22 are each loosely mounted in the slotways provided in the spacer 23. By virtue of this construction, the spacer 23 and the weights 22 are free to act as a unit which may move rotationally relative to the cups 16 and 21 and independently of the quill 15. Since during both the feed cycle and retraction cycle there are intervals during which the inertia forces in the weight and spacer assembly are such that it tends to rotate at a different speed from the cups 16 and 21 and the quill 15, it will be seen that the entire weight and spacer assembly will move relative to the cups 16 and 21. During such movement, each of the weights 22 is free to rotate in its slotway and about its own longitudinal axis and relative to the spacer 23. Thus it will be seen that the radial movement of the weights 22 is not confined to fixed paths relative to the cups 16 and 21 and hence that wear is distributed over different areas of contact between the surfaces of the cups 16 and 21 and the ends of the weights 22.

In the construction here shown, it will be seen that the ends of the weights 22 have a line contact with the adjacent surfaces of the cup members 16 and 21. The centrifugal forces generated in the weights 22 cause their uniform movement in a direction radially outward of the center of rotation of the cup and weight assembly, thus maintaining the parallel spaced arrangement of the weights relative to each other. At periods of deceleration or acceleration of the cup elements, the weights 22 and spacer 23 are caused to change position relative to the cup elements due to the inertia effect in the weights 22 and the spacer 23. Thus the lines of contact between the ends of the weights 22 and the cup members 16 and 21 are altered during each change in speed of the cup members. Thus there is no localized wear on the surface of the cup members along the lines of fixed paths.

Figure 5:
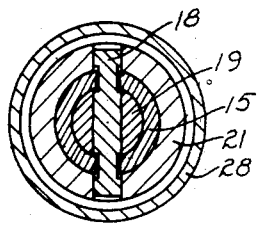
Fig. 5 is a cross-section taken substantially on the line 5—5 in the direction of the arrows Fig. 3.

As shown in Fig. 5, the key 18 is carried in the spindle 19 and extends through the longitudinal slot in the quill 15 and engages the axial portion of the cup 21 at the point 24 (Fig. 1). Since the conical cup 16 is also secured to the quill 15, both cups rotate at the same speed.

Mounted on the conical cup 21 is a dash pot construction including a cylinder 25 having a piston mechanism movable therein. The piston mechanism comprises a sealing washer 26, supporting structure 27, and an axial aligning and mounting mechanism 28, which engages the ground portion 29 of quill 15 by means of a circular keeper 30.

Seated within the cylinder 25 between one end and the piston mechanism is a spring 31 which maintains the relative positions of cylinder 25 and the piston mechanism when the machine is not in operation, and which returns the parts to their normal position at the completion of each operative cycle of the machine.

Shown generally at 32 is the end bearing and oil seal provision for supporting the tubular member 15 and the spindle 19 in axial alignment.

At 33 is shown an electric switch operated by the shaft 34 slideably mounted through the end frame of the electric motor 10. A sealing diaphragm 35 is provided to prevent the flow of vapors, or oil, or any other undesirable foreign matter from the cavity of one mechanism to the other. Movement of the shaft 34 in a longitudinal direction effects the operation of electric switch 33. Such movement is caused, as shown in Fig. 3, by the engagement of rim 21a on the conical cup 21, with a cam projection 36 on a lever 37 which is pivoted on shaft 38 and maintained in a normal position by the spring 39.

The electric switch 33 is operated by its associated mechanism when the conical cup 21 is moved by the action of the weights 22 in the direction shown by arrow to a point wherein the rim 21a engages the cam projection 36.

Figure 2:
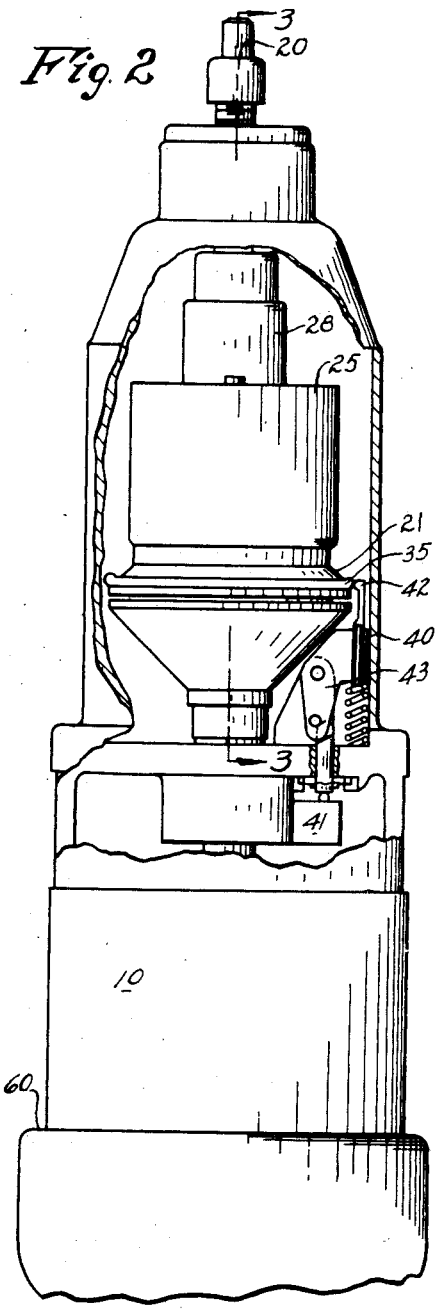
Fig. 2 is a fragmentary plan view with parts broken away taken from a position substantially ninety degrees removed from the plane of the cross-section of Fig. 1.

A switch mechanism 41 is mounted at a point removed 90° from switch 33 and is shown in Fig. 2. This switch is provided with an operating mechanism 40 similar to that provided for switch 33 but which is operated when the conical member 21 returns to its normal position causing engagement of the rim 21a with a cam projection 42 on the switch operating mechanism 40 which operates the pivotally-mounted dog leg lever shown generally at 43 to operate the switch 41. The switch 41 may be used to reestablish the feeding cycle, or if desired it may be used for controlling the operation of auxiliary units such for example as conventional types of indexing chucks or the like.

Figure 3:
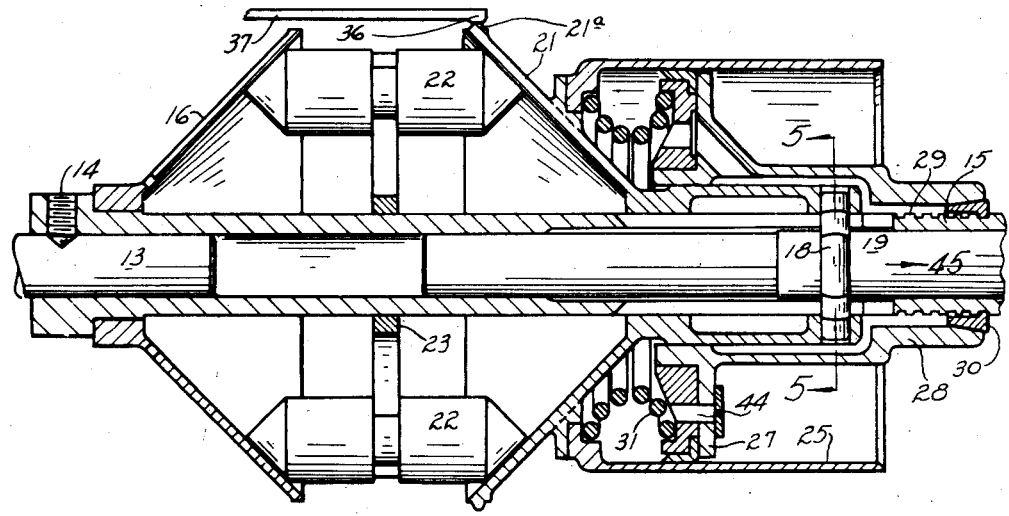
Fig. 3 is an enlarged cross-sectional view showing the centrifugally actuated spindle feeding mechanism.

In Fig. 3, the conical cups 16 and 21 are shown enlarged and displaced from the position shown in Fig. 1, by the action of the centrifugal weights 22. Rotation of the conical cups 16 and 21 rotates the weights 22. Centrifugal forces are thus generated in the weights which drives them outward radially of the quill 15. Such radial force, by action of the angular conical construction of the ends of the weights, transmits an axial force tending to move the movable conical cup 21 away from the fixed conical cup 16. Since the conical cup 16 is rigidly attached to the quill 15, the axial displacement is accomplished entirely by the movement of the conical cup 21. Such movement of the cup 21 is adjustably resisted by the spring 31 and the exhausting of air through the port 44. Axial movement of the conical cup 21 by reason of its engagement of key 18 effects an axial movement of the spindle 19 and the collet 20 in the direction of arrow 45.

Figure 4:
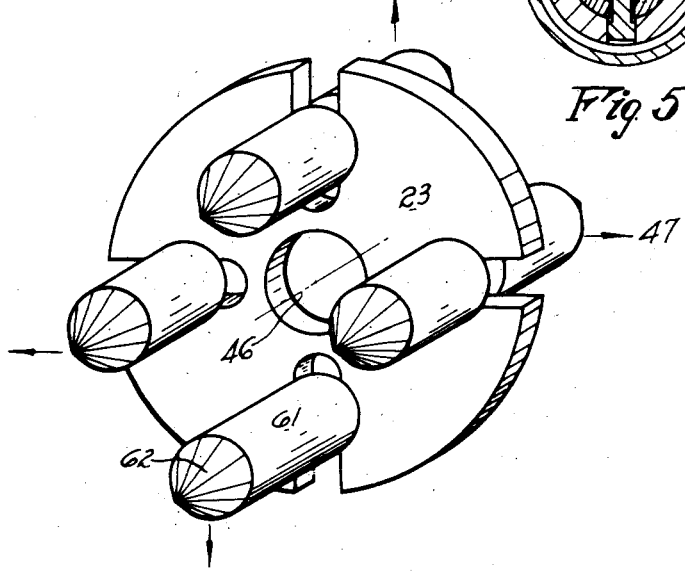
Fig. 4 is an isometric view of the centrifugal weight system showing the position of the weights in the weight spacing member.

Shown in Fig. 4 is the spacer 23 for maintaining the constant relative positions of the weights 22. Rotation of the cup members 16 and 21 imparts to the weights 22 a radial force tending to throw them outwards in the direction of arrows 47.

In operation, the operator actuates a main control switch (not shown) which releases the brake and energizes the electric motor 10 which initiates the rotation of the whole system. Such rotation imparts centrifugal force to the weights 22 which, in turn, by the mechanical train heretofore described effects the advancement of spindle 19 with its cutting tool mounted in the collet 20. The advancement continues at a predetermined rate and by the method previously described until the switch 33 is operated which cuts the flow of power to the motor 10 and the brake system 12, as hereinafter more fully described.

Each of the centrifugal weight members 25 comprises a generally cylindrical body portion 61 each end of which is provided with a conical surface 62 having substantially the same angles as the inside conical faces of the conical cups 16 and 21. This provides a rolling contact between the ends of the weights and the surfaces of the cups 16 and 21 which occurs principally during the periods of change in the speed of rotation of the quill assembly. This reduces the friction as compared with that of constructions in which the weights slide bodily in the cup members and contributes to improved operating characteristics of the feed head of the present invention.

The electro-mechanical brake system 12 is disclosed in greater detail and is the subject matter of my co-pending application Serial No. 597,835, now abandoned. It comprises the brake disc 48 having annular braking surfaces 49 and 50. The brake disc 48 is splined on a stub shaft 51, which is connected for rotation by the armature 11. Brake friction members 52 and 53 are disposed adjacent the annular braking surfaces 49 and 50 and exert a braking force on the braking plate 49 when the brake is applied. Braking pressure is applied to the brake through the brake pressure plate 54 by the brake applying spring 55. In Fig. 1, the brake is shown in its off or unapplied position. In this position, the spring 55 is collapsed and the pressure plate 54 is held out of engagement with the friction disc 52 by energization of the electro-magnetic coil 56. The forces generated in the electro-magnetic coil 56 are of such a magnitude as to draw the pressure plate 54 into the position shown in Fig. 1, against the pressures of the brake applying spring 55.

When the conical cup 21 has moved to the end of its tool feeding stroke as shown in Fig. 3, the switch 33 is actuated to cut off the electric current to the motor 10 and at the same time to cut off the flow of current through the coil 56. This releases the pressure plate 54 and the spring 55 applies a braking pressure against the disc 47, which in turn exerts a braking force on the annular braking surface 49, which causes the brake disc 48 to move toward the friction disc 53 where a further braking force is exerted on the disc 48. This causes the weights 22 to cease rotation and the action of the spring 31 on the cup 21 causes its return to the position shown in Fig. 1.

Since the operating cycle of a device of this type is relatively short, it is desirable to provide a means for the rapid dissipation of heat generated in the braking mechanism 12 during the braking cycle. In the present instance this is provided by an air stream which is drawn into the motor housing through the air intake opening 57 provided in the central portion of the electro-magnetic coil 56. A plurality of fan blades 58 are mounted on the brake plate 48 so that during rotation of the plate 48 air is drawn inwardly through the air inlet 57, and is discharged through air ducts 59, which communicate with air exhaust ports 60.

The flow of air through the inlet air port 57 and through the air ducts 59 to the air discharge port 60, not only cools the brake mechanism but likewise dissipates the heat developed in the rear portion of the housing of the motor 10.

By varying the effective opening in the air escape port 63 in the supporting structure 27 forming a part of the piston mechanism, the rate of movement of the piston in either direction with relation to the cylinder 25 may be regulated to provide the desired timing of the operation cycle and the feeding pressures to be exerted on the tool in the collet 20.

By the present construction, a positive mechanical stop is provided when the end of the axial portion of the conical cup 21 contacts the end of the chamber in the aligning member 28. The inertia of the rotating parts will effect rotation and feeding of the tool after the switch 33 is operated so that even after the circuit is broken a slight feeding action will result. This will cause the further feeding movement of the cup 21 from its position as shown in Fig. 3 to the position in which the end of the cup 21 contacts the inside edge of the chamber in the aligning member 28. In this manner a dwell will be provided during which time a tool in the collet 20 will be rotated without a feeding pressure being exerted thereon. This feature is particularly desirable where shallow holes are to be drilled or a part is to be spot faced or in any operation in which the cutting marks of the drill or other tool are objectionable. The rotation of the tool without feeding pressures thereon will remove the cutting marks of the tool. In addition, this positive mechanical stop assures an accurate and positive control of the extent in depth of the workpiece of the machine operation.

I claim:

1. A feed head for feeding a rotating tool to a work piece at a predetermined substantially constant pressure and rate and comprising a housing, a shaft rotatable therein, a sleeve mounted on said shaft, a fixed member and a push member mounted on said sleeve, a plurality of centrifugally actuated radially movable separate cylindrical weights symmetrically disposed about said shaft between said fixed member and said push member with their longitudinal axes substantially parallel to the axis of said shaft, a tool holder connected with said sleeve, means for arresting rotation of said shaft after a predetermined movement of said push member, a spring for retracting said push member and said tool holder after actuation of said means for arresting rotation of said shaft, and a spacer member carried on said sleeve and connected with said centrifugally actuated radially movable weights to permit the independent rotation of each of said weights about its own longitudinal axis while being rotated as a part of a unit whose axis of rotation coincides with the axis of rotation of said shaft whereby a feeding pressure is exerted on said push member when said weights are moved radially in said spacer and in a direction outwardly of said shaft.

2. A feed head for feeding a rotating tool to a work piece at a predetermined substantially constant pressure and rate and comprising a body portion, a shaft rotating therein, a quill mounted on said shaft, a fixed member and a push member carried by said quill, a plurality of centrifugally actuated weights symmetrically disposed about said quill and rotatably mounted in a spacer member between said fixed member and said push member and movable outwardly thereof upon rotation of said shaft whereby a force is exerted to effect sliding movement of said push member, a tool holder connected with said push member, a brake for arresting rotation of said shaft after a predetermined movement of said push member, a spring for retracting said push member and said tool holder after actuation of said brake, each of said centrifugally actuated weights comprising a substantially cylindrical member mounted for separate rotation about its own longitudinal axis along a radial path in said spacer, and adapted to exert a feeding pressure on said push member when moved outward along said radial path by the centrifugal forces of rotation, and means operable on said weights for regulating the rate of feeding movement and the rate of return of said tool after the completion of the feeding cycle.

3. A feed head for feeding a rotating tool to a work piece at a predetermined substantially constant pressure and rate and comprising a body portion, a shaft rotating therein, a quill mounted on said shaft, a fixed member and a push member carried by said quill, a plurality of centrifugally actuated weights symmetrically disposed about said quill and rotatably mounted in a spacer member between said fixed member and said push member, a tool holder connected with said push member, a brake for arresting rotation of said shaft after a predetermined movement of said push member, a spring for retracting said push member and said tool holder after actuation of said brake, each of said centrifugally actuated weights comprising a substantially cylindrical member mounted for separate rotation about its own longitudinal axis along a radially extending path in said spacer, and adapted to exert a feeding pressure on said push member when moved radially in said path by the centrifugal forces of rotation, and means operable on said weights for regulating the rate of feeding movement and the rate of return of said tool, and comprising a cylinder secured to said push member, a piston mounted on said rotating shaft and extending within said cylinder, a return spring located between said piston and one end of said cylinder to resist relative movement of said piston and said cylinder, and an adjustable air port for controlling the rate of exhausting and feeding air from said cylinder.

4. A feed head adapted to move a rotating tool at a substantially constant rate and at a predetermined pressure into a work piece and comprising a power driven rotating shaft, a quill secured to said shaft, a tool holding member connected to said quill for rotation therewith, a plurality of centrifugally actuated weight members symmetrically disposed about said quill, a fixed member secured to said quill adjacent one end of said weight members, a push member slidably mounted on said quill adjacent the other end of said weight members, a spacer member for spacing said weights symmetrically about said shaft and permitting the separate rotation of each of said weights about its longitudinal axis while moving bodily in a path extending radially of said spacer, a brake for arresting rotation of said weights and the advancement of said tool holder after a predetermined traverse of the work piece by the rotating tool, and means for returning said tool holder and said weights to their initial positions after the application of said brake.

5. In a device for automatically feeding a rotating tool into a work piece at a predetermined rate and pressure and for a predetermined distance, a plurality of weight members drivingly connected with a rotatable tool driving spindle and adapted to be moved radially outward of the longitudinal axis of said spindle by the centrifugal force developed by rotation of said members, said radial movement of said members being adapted to produce a composite force acting along the axis of rotation of said tool spindle to feed said tool spindle toward said work piece, means actuated after a predetermined radial movement of said weight members to stop further rotation of said tool driving spindle, a resilient member for returning said weight members to their initial position upon actuation of said last named means and to control the feeding rate of said rotating tool, and comprising a cylinder, a piston movable relative to said cylinder, a spring interposed between said piston and an end of said cylinder, and resisting relative movement of said piston and said cylinder and an adjustable air port in said piston for varying the amount of air passing through said piston, thereby regulating the speed of movement of said piston and said cylinder relative to each other.

6. An automatic feed head for advancing a rotating tool into a work piece at a predetermined rate and feeding pressure and including a tool holder, power means for rotating the tool holder, means for arresting rotation and advancement of said tool holder after a predetermined traverse of the work piece by the rotating tool, tool feeding means operable on said tool holder to effect tool feeding movement thereof, and including a plurality of weight members each mounted for separate rotation about its longitudinal axis and for bodily movement along a radial path, each of said weights being adapted to exert a feeding pressure on the tool holder when moved radially outward along said radial paths in response to the centrifugal forces of rotation, and means for returning each of said weights and the said tool holder to their initial positions after rotation and advancement of said tool holder is arrested.

7. An automatic feed head for advancing a rotating tool into a work piece at a predetermined rate and feeding pressure and including a tool holder, power means for rotating the tool holder, a brake for arresting rotation and advancement of said tool holder after a predetermined traverse of the work piece by the rotating tool, tool feeding means operable on said tool holder to effect tool feeding movement thereof, and including a plurality of substantially cylindrical weight members, each mounted in a spacer member for separate rotation about its longitudinal axis and in equally spaced relation to each of the other of said weight members, all of said weight members and said spacer member being rotatable as a unit with said tool holder, whereby each of said weights exerts a feeding pressure on the tool holder when they are moved radially outward by the centrifugal forces of rotation, and means for returning each of said weights and the said tool holder to their initial positions after said brake is applied.

8. An automatic feed head for advancing a rotating tool into a work piece at a predetermined rate and feeding pressure, and including a tool holder, power means for rotating the tool holder, means for arresting rotation and advancement of said tool holder after a predetermined traverse of the work piece by the rotating tool, tool feeding means actuated by the centrifugal forces of rotation for feeding said tool into said work piece and including a fixed cup and an axially movable cup, each of said cups having a conical interior and mounted for rotation with said tool holder, a plurality of cylindrical weight members rotatably carried by a spacer within said cup, the ends of each of said weight members having conical surfaces for establishing a line contact with the faces of the conical interiors of said cups whereby when the centrifugal forces of rotation effect a radial movement of said weight members in said spacer, each of the said weight members is free to rotate in said cups while being moved toward the peripheries thereof to thereby effect an axial movement of said axially movable cup, and means for returning said weights and said axially movable cup to their initial positions after rotation and advancement of the tool holder is arrested.

9. An automatic feed head for advancing a rotating tool into a work piece at a predetermined rate and feeding pressure, and including a tool holder, power means for rotating the tool holder, a brake for arresting rotation and advancement of said tool holder after a predetermined traverse of the work piece by the rotating tool, tool feeding means actuated by the centrifugal forces of rotation for feeding said tool into said work piece and including a fixed cup and an axially movable cup, each of said cups having a conical interior and mounted for rotation with said tool holder, a plurality of weight members rotatably carried by a spacer within said cup, the ends of each of said weight members rotatably contacting the faces of the conical interiors of said cups whereby when the centrifugal forces of rotation effect a radial movement of said weight members in said spacer, each of the said weight members is rotated in said cups while being moved toward the peripheries thereof to thereby effect an axial movement of said axially movable cup, and means for returning said weights and said axially movable cup to their initial positions after said brake is applied, said means comprising a resilient member for returning said axially movable cup to its initial position, means for controlling the operation of said resilient member and comprising a cylinder surrounding said member, and a piston spaced relative in said cylinder by said spring, and means for regulating the flow of air into and out of said cylinder to control the rate of relative movement of said piston and said cylinder.

10. An automatic feed head for advancing a rotating tool into a work piece at a predetermined rate and feeding pressure, and including a tool holder, power means for rotating the tool holder, a brake for arresting rotation and advancement of said tool holder after a predetermined traverse of the work piece by the rotating tool, tool feeding means actuated by the centrifugal forces of rotation for feeding said tool into said work piece and including a fixed cup and an axially movable cup, each of said cups having a conical interior and mounted for rotation with said tool holder, a plurality of generally cylindrical weight members mounted for independent rotation in a spacer member, a conical surface on each end of said weight members extending at substantially the same angle as the angle of the conical interior surfaces of said cups to provide a rolling bearing contact between the ends of said weights and the interior surfaces of said cups, whereby when the centrifugal forces of rotation effect a radial movement of said weight members in said spacer, each of the said weight members is rotated in said cups while being moved toward the peripheries thereof to thereby effect an axial movement of said axially movable cup, and means for returning said weights and said axially movable cup to their initial positions after said brake is applied.

11. A feed head as claimed in claim 1 and further characterized in that said push member engages a mechanical stop which arrests its axial movement while the rotating tool is in contact with the work piece.

12. A feed head as claimed in claim 1 and further characterized in that said substantially cylindrical weight members have conical end surfaces which provide a rolling contact with opposed conical internal wall surfaces provided on said fixed member and said push member.

13. A feed head as claimed in claim 1 and further characterized in that said spring is mounted in a dash pot having adjustable means to control the rate of compression of said spring.

CLAUDE E. BRODERS.

REFERENCES CITED

The following references are of record in the file of this patent:

UNITED STATES PATENTS

| Number | Name | Date |
|---|---|---|
| 2,306,696 | Hale | Dec. 29, 1942 |
| 860,590 | Williams | July 16, 1907 |
| 2,346,359 | Claus | Apr. 11, 1944 |
| 1,069,995 | Anderson | Aug. 12, 1913 |